Patented Feb. 18, 1941

2,232,100

UNITED STATES PATENT OFFICE 2,232,100

PROCESS OF DECOMPOSING BARIUM SULPHATE

Fredrik W. de Jahn, New York, N. Y., assignor to Alan N. Mann, Scarsdale, N. Y.

No Drawing. Application April 16, 1938, Serial No. 202,446

6 Claims. (Cl. 23—177)

In my copending application, Serial No. 137,009, filed April 15, 1937, I set forth my discovery that the alkaline earth sulphates can be reduced to the oxides with the evolution of $SO_2$ gas by the use of between 1 and 1.5 molecules of carbon for each 2 molecules of the sulphate.

The present application relates specifically to the employment of that invention in the reduction of barium sulphate.

As regards the amount of carbon to be employed in the reduction of barium sulphate, the same limits apply as those already stated, but it is to be understood that this must be interpreted as defining the amount of carbon to take part in the reaction, and if the material is treated in such a manner that carbon can be consumed before the actual reduction reaction begins, then additional carbon may be necessary to compensate for this loss. Generally speaking, I find it advantageous to have between about 1 and 1.3 molecules of carbon present in the reaction for each 2 molecules of barium sulphate.

In reducing barium sulphate the principal difficulty to be overcome (provided the carbon proportion is correct) is fusion of the mass. I have discovered that two steps must be taken to prevent fusion of the mass before the necessary temperature is reached so that the reaction may be completed.

One of the important features of this application is that I accomplish a direct-fired reducing operation while avoiding the presence of appreciable percentages of $CO_2$ gas in the atmosphere. If there is sufficient $CO_2$ gas present so that it reacts with the barium oxide formed, it is probable that basic barium carbonates are produced, and these apparently are readily fusible, for certain of the barium carbonates have a fusing point as low as about 1650° F. This of course means that the barium sulphate cannot be reduced in a direct-fired furnace, such as a rotary kiln, using any of the usual fuels, but I have discovered that this difficulty can be entirely obviated by burning hydrogen as the fuel for the reaction. Of course, small percentages of hydrocarbons may be included, but the percentage must be sufficiently low so that the partial pressure of any $CO_2$ resulting from combustion plus that formed during the reaction, is lower than the $CO_2$ tension over barium oxide at the temperature prevailing when barium oxide is produced as a result of the reduction process. I have not ascertained the exact percentage of $CO_2$ that may be present, but the literature indicates that at a temperature of about 2280° F. the vapor tension of $CO_2$ over barium oxide is about 68 millimeters, or approximately equal to about 9% by volume. Therefore, since the barium oxide apparently begins to form in appreciable quantities at about this temperature, I can state that the percentage of $CO_2$ in the combustion gases should not be in excess of 9% by volume. Preferably I burn a fuel such as hydrogen which is substantially free of carbonaceous components. The mixture of fuel and air should be so adjusted as to give an approximately neutral flame.

In addition to the avoidance of the formation of carbonates, I find that avoidance of fusion can also be aided by the introduction of certain elements which tend to form refractory bodies at the temperatures employed. These may react with part of the barium and thus somewhat lower the yield, but they definitely permit the use of higher temperatures without fusion, and therefore make the completion of the reaction possible.

The most efficient materials which I have found to prevent this fusion are silica and lime, which should be introduced in relative proportions to form one of the calcium silicates. This proportion may vary within the range between monocalcium silicate and tricalcium silicate. Generally speaking, there should be at least as much as 10% of such calcium silicate present. I have also found that somewhat better results are obtained if the lime and silica are caused to react first and then are added to the sulphate ore in the form of the reacted product. Apparently the calcium silicate reacts with part of the barium to form a complex calcium barium silicate and apparently when once this compound is formed, it can itself be used with additional quantities of barium sulphate ore as a preventative of fusion.

As an example of a procedure which has given satisfactory results, I have employed 20% of dicalcium silicate based on the weight of the barytes employed. Using this amount of calcium silicate and employing about 1.2 mols of carbon for each 2 mols of barium sulphate, I have been able to keep the reaction mass in a rotary kiln to a temperature of about 2750° F. employing hydrogen as a fuel, and obtained a totally unfused product. This product was entirely free of sulphides and carbonates and contained substantial percentages of barium oxide which could be leached out with hot water to give pure barium hydrate.

While I prefer to use a calcium silicate as an agent for assisting in the avoidance of fusion, I have also obtained valuable results (though somewhat less advantageous) by substituting magnesia or alumina in whole, or in part, for the lime. I have also found that silica can be added in the form of barium silicate, and the lime added separately, but in any of these cases I believe that before the reaction is completed some compound of barium, silicon and calcium is present. The silica may also be replaced at least in part by titanium.

My researches have indicated that to get satisfactory results with barium, temperatures in excess of 2400° F. must be employed and preferably the temperature should exceed 2600° F. Such temperatures cannot be reached in a direct-fired furnace without fusion except by the precautions here indicated or their equivalents and it is an essential feature of my invention that the mass shall not be fused.

What I claim is:

1. The process of decomposing barium sulphate into barium oxide and oxides of sulphur, which consists in preparing an intimate mixture of finely divided barium sulphate with finely divided carbon substantially in a ratio to have present between .5 and .75 mol of carbon for each mol of barium sulphate and with at least 10% of calcium silicate, and heating the same in a direct fired rotary kiln having an approximately neutral atmosphere containing not over about 90% of $CO_2$ at a temperature in excess of 2400° F.

2. A process as specified in claim 1, in which the calcium silicate is principally dicalcium silicate.

3. A process as specified in claim 1, in which the ratio of carbon to barium sulphate is approximately in the ratio of about .6 mol of carbon for each mol of $CaSO_4$.

4. The process of decomposing barium sulphate into barium oxide and oxides of sulphur which consists in preparing an intimate mixture of finely divided barium sulphate with finely divided carbon substantially in a ratio to have present between .5 and .75 mol of carbon for each mol of barium sulphate and heating the same progressively in a rotary kiln by the combustion of a substantially carbon-free fuel consisting essentially of hydrogen and in an approximately neutral atmosphere until a temperature in excess of 2400° is reached, whereby the atmosphere in such furnace is maintained with a sufficiently low percentage of carbon dioxide at such temperature, substantially to prevent the formation of barium carbonate.

5. The process of decomposing barium sulphate into barium oxide and oxides of sulphur, which consists in preparing an intimate mixture of finely divided barium sulphate with finely divided carbon approximately in the ratio of about 0.6 mol of carbon for each mol of $BaSO_4$ and with at least 10% of calcium silicate, and progressively heating the same in a direct fired rotary kiln in a substantially neutral atmosphere containing not over approximately 9% of $CO_2$ at a temperature of 2400° F.

6. The process of decomposing barium sulphate into barium oxide and oxides of sulphur which consists in preparing an intimate mixture of finely divided barium sulphate with finely divided carbon substantially in a ratio to have present between .5 and .75 mol of carbon for each mol of barium sulphate and heating the same in a rotary kiln in a direct fired and substantially neutral atmosphere containing not over 9% of $CO_2$ at a temperature of between 2400° F. and 2750° F. until the reaction has been substantially completed.

FREDRIK W. DE JAHN.

CERTIFICATE OF CORRECTION.

Patent No. 2,232,100.　　　　　　　　　　　　　　February 18, 1941.

FREDRIK W. de JAHN.

It is hereby certified that error appears in the printed specification of the above numbered patent requiring correction as follows: Page 2, first column, line 32, claim 1, for "90%" read --9%--; and that the said Letters Patent should be read with this correction therein that the same may conform to the record of the case in the Patent Office.

Signed and sealed this 25th day of March, A. D. 1941.

Henry Van Arsdale,
Acting Commissioner of Patents.

(Seal)